June 14, 1949.  A. BECHLER  2,472,880

TRANSMISSION GEAR FOR MACHINE TOOLS

Filed Sept. 20, 1946

INVENTOR
ANDRÉ BECHLER
BY Young, Emery & Thompson
ATTYS

Patented June 14, 1949

2,472,880

UNITED STATES PATENT OFFICE 2,472,880

TRANSMISSION GEAR FOR MACHINE TOOLS

André Bechler, Berne, Switzerland

Application September 20, 1946, Serial No. 698,196
In Switzerland May 3, 1946

5 Claims. (Cl. 74—242.10)

The invention relates to a transmission gear for machine tools consisting of a counter-shaft interposed between the main shaft and the live spindle. The line connecting the centres of these shafts enclose an angle. The gear is characterised by the fact that the bearings of the countershaft are integral with a frame suspended in a manner as to be capable of both rocking and translatory motion.

Such gear can be employed, for instance, in automatic lathes, to tighten simultaneously the different belts passing over the counter-shaft pulleys.

The drawing shows, by way of example, two embodiments of a transmission gear according to the present invention, as applied to an automatic lathe, the parts necessary to the understanding of the invention only being represented.

Figures 1, 2:
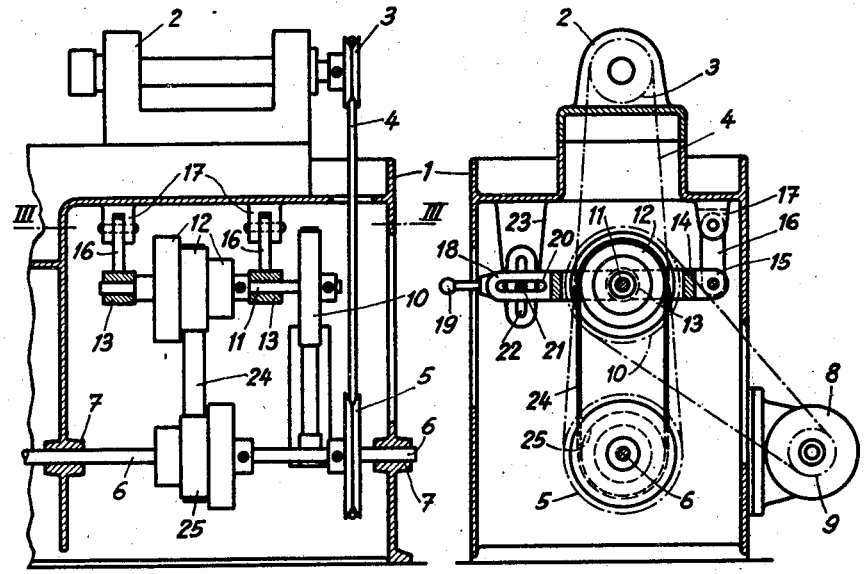
Fig. 1 is a side-elevation of the back end of the lathe with a portion in section.
Fig. 2 is an end-elevation of the same with a portion in section.
Figures 3, 4:
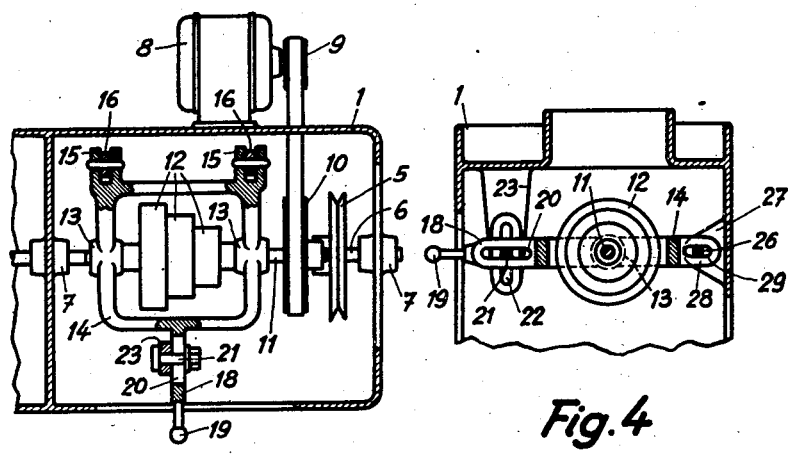
Fig. 3 is a sectional view of the same along the line III—III in Fig. 1.
Fig. 4 is a view of one of the parts in a second embodiment of the invention.

With respect to Figs. 1, 2 and 3, 1 denotes the stand-framework of an automatic lathe, carrying a headstock 2 driven by a pulley 3 connected to a second pulley 5 by means of a belt. The pulley 5 is keyed to the shaft 6 whose bearings are cast integral with the foot of the lathe. The latter forms a housing in which a pair of cone pulleys and different shafts are arranged, to provide a certain speed range of the live spindle from the motor 8 fixed to the stand 1.

The driving pulley 9 of the motor is connected to the pulley 10 keyed on the countershaft 11 carrying a cone pulley 12 with three steps, whose bearings 13 are integral with a frame 14. This frame is provided with knuckle joints 15 of which the connecting rods 16 are articulate with shoes 17 solid with the stand. At the other end of the frame a lateral projecting piece 18 is provided, ending in a handle 19 and having a slot 20 which forms a member of the compound slide adjustment in the shape of a cross. A bolt 21 is inserted through this slot and through another slot 22 in the other member of the compound slide-adjustment, formed by a vertical support 23 cast integral with the stand.

The cone pulley 12 can be connected in different speed ratios to the cone pulley 25 keyed on the shaft 6, by means of a belt 24. It can be seen from the drawing, particularly from Fig. 2, that the lines drawn from centre to centre of the axes 11 and 6, 11 and 9 enclose an angle. Now, should one or the other of the belts connecting the motor to the countershaft with cone pulley 10, 11, 12, and the latter to the shaft 6, respectively, become slack, then it is possible to regulate them by manipulating the compound slide-adjustment. The blocking nut of the latter must first be loosened so as to permit manipulation of the handle 19 by which the frame can be moved simultaneously to and fro and about the articulation formed by the connecting rods.

The transmission gear is capable of being moved, so as to adjust both belts at the same time and with correct tightness. This is of capital importance when using thin endless belts, as for instance in machines running at high speeds.

The same result could be obtained, i. e. simultaneous adjustment of the length of the belts, by pivoting the frame to a pin 26 (see Fig. 4) projecting from the flange 27 cast integral with the stand. The frame is thus provided with projections 28 with slot 29 in the place of the knuckle-joint 15, permitting both translatory and rocking motion of the frame with a view to tightening the belts passing over the countershaft cone pulley 10, 11, 12.

What I claim is:

1. In a transmission gear for machine tools, a framework, a drive shaft mounted on said framework, a driven shaft mounted on said framework, a countershaft, wheels on said drive shaft, driven shaft and countershaft, transmission means interconnecting wheels of said drive shaft and said countershaft, other transmission means interconnecting wheels of said countershaft and said driven shaft, a pivot on said framework, a frame carrying said countershaft, suspended on said pivot for rocking and translatory motion in a manner as to allow the distance between said pivot and said countershaft of being changed, a slot on said framework, a slot on said frame, lying across the slot on said framework, a releasable locking means going through said slots, allowing in its released condition translatory and rocking motion of said frame and said latter to be locked at any position of said locking means along said slots.

2. In a transmission gear for machine tools, a framework, a drive shaft mounted on said framework, a driven shaft mounted on said framework, a countershaft, wheels on said drive shaft, driven shaft and countershaft, transmission means interconnecting wheels of said drive shaft and said countershaft, other transmission means interconnecting wheels of said countershaft and said driven shaft, a pivot on said framework, a frame carrying said countershaft, suspended on said pivot for simultaneous rocking and translatory motion in a manner as to allow the distance between said pivot and said countershaft of being changed, a slot on said framework, a slot on said frame at the side of said countershaft opposite to said pivot, said slots crossing each other, a releasable locking means going through said slots, allowing in its released condition translatory and rocking motion of said frame and said latter to be locked at any position of said locking means along said slots.

3. In a transmission gear for machine tools, a framework, a drive shaft mounted on said framework, a driven shaft mounted on said framework, a countershaft, wheels on said drive shaft, driven shaft and countershaft, transmission means interconnecting wheels of said drive shaft and said countershaft, other transmission means interconnecting wheels of said countershaft and said driven shaft, a pivot on said framework, a frame carrying said countershaft, suspended on said pivot for simultaneous rocking and translatory motion in a manner as to allow the distance between said pivot and said countershaft of being changed, a slot on said framework, a slot on said frame at the side of said countershaft opposite to said pivot, said slots crossing each other, a releasable locking means going through said slots, allowing in its released condition translatory and rocking motion of said frame and said latter to be locked at any position of said locking means along said slots, and a manipulating member fixed to said frame serving to carry out simultaneous rocking and translatory motion of said frame.

4. In a transmission gear for machine tools, a framework, a drive shaft mounted on said framework, a driven shaft mounted on said framework, a countershaft, wheels on said drive shaft, driven shaft and countershaft, transmission means interconnecting wheels of said drive shaft and said countershaft, other transmission means interconnecting wheels of said countershaft and said driven shaft, pivots on said framework, links articulated on said pivots, a frame carrying said countershaft, articulated on said links for rocking and translatory motion in a manner as to allow the distance between said pivot and said countershaft of being changed, a slot on said framework, a slot on said frame at the side of the said countershaft opposite to said pivot, said slots crossing each other, a locking bolt going through said slots, allowing in its released condition translatory and rocking motion of said frame and said latter to be locked at any position of said locking bolt along said slots, and a handle fixed to said frame serving to carry out simultaneous rocking and translatory motion of said frame.

5. In a transmission gear for machine tools, a framework, a drive shaft mounted on said framework, a driven shaft mounted on said framework, a countershaft, wheels on said drive shaft, driven shaft and countershaft, transmission means interconnecting wheels of said drive shaft and said countershaft, other transmission means interconnecting wheels of said countershaft and said driven shaft, a pivot on said framework, a frame carrying said countershaft, having a slot in engagement with said pivot for suspending said frame on said framework for rocking and translatory motion in a manner as to allow the distance between said pivot and said countershaft of being changed, a slot on said framework, a second slot on said frame at the side of the said countershaft opposite to said pivot, said slot of said framework and said second slot crossing each other, a locking bolt going through said crossing slots, allowing in its released condition translatory and rocking motion of said frame and latter to be locked at any position of said locking bolt along said crossing slots, and a handle fixed to said frame serving to carry out simultaneous rocking and translatory motion of said frame.

ANDRÉ BECHLER.

REFERENCES CITED

The following references are of record in the file of this patent:

UNITED STATES PATENTS

| Number | Name | Date |
|---|---|---|
| 2,311,993 | Olsen | Feb. 23, 1943 |

FOREIGN PATENTS

| Number | Country | Date |
|---|---|---|
| 17,522 | Great Britain | 1898 |